United States Patent
Trombetta

(10) Patent No.: US 7,655,310 B2
(45) Date of Patent: Feb. 2, 2010

(54) POLYURETHANES

(75) Inventor: Tania Trombetta, Milan (IT)

(73) Assignee: Solvay Solexis S.p.A., Milan (IT)

( * ) Notice: Subject to any disclaimer, the term of this patent is extended or adjusted under 35 U.S.C. 154(b) by 416 days.

(21) Appl. No.: 11/043,615

(22) Filed: Jan. 27, 2005

(65) Prior Publication Data
US 2005/0164010 A1 Jul. 28, 2005

(30) Foreign Application Priority Data
Jan. 27, 2004 (IT) .......................... MI2004A0106

(51) Int. Cl.
*B32B 17/40* (2006.01)
*C08G 18/10* (2006.01)

(52) U.S. Cl. ........................ 428/423.1; 528/60; 528/61; 528/66; 528/70

(58) Field of Classification Search ............. 428/423.1; 528/60, 61, 66, 70
See application file for complete search history.

(56) References Cited

U.S. PATENT DOCUMENTS

| 3,242,218 A | 3/1966 | Miller |
| 3,715,378 A | 2/1973 | Sianesi et al. |
| 3,810,874 A | 5/1974 | Mitsch et al. |
| 4,523,039 A | 6/1985 | Lagow et al. |
| 4,647,413 A | 3/1987 | Savu |
| 4,746,550 A | 5/1988 | Strepparola et al. |
| 5,149,842 A | 9/1992 | Sianesi et al. |
| 5,258,110 A | 11/1993 | Sianesi et al. |
| 5,959,058 A | 9/1999 | Tonelli et al. |
| 6,071,564 A | 6/2000 | Marchetti et al. |
| 6,313,335 B1 | 11/2001 | Roberts et al. |
| 2003/0168783 A1 | 9/2003 | Dams |

FOREIGN PATENT DOCUMENTS

| EP | 0 148 482 A2 | 7/1985 |
| EP | 0 239 123 A2 | 9/1987 |
| EP | 0 340 740 A2 | 11/1989 |
| EP | 1 130 005 A2 | 9/2001 |
| EP | 1 327 644 A1 | 7/2003 |
| EP | 1 369 442 A1 | 12/2003 |
| GB | 1104482 | 2/1968 |
| WO | WO 90/03357 A1 | 4/1990 |
| WO | WO 96/10595 A1 | 4/1996 |

OTHER PUBLICATIONS

Kirk-Othmer, "Silicon Compounds (Silicones)," Encyclopedia of Chemical Technology, Fourth Edition, vol. 22—Silicon Compounds to Succinic Acid and Succinic Anhydride, title page and pp. 118-119.

*Primary Examiner*—Thao T. Tran

(57) ABSTRACT

Polyurethanes-urea based on perfluoropolyethers comprising ionizable groups and pendant groups having the following structure:

$$-R^I-Si(OR^{II})_n(OH)_{3-n} \quad (I)$$

wherein:
$R^I$ is alkylene from 1 to 10 carbon atoms;
$R^{II}$ is an alkyl group from 1 to 4 carbon atoms;
n is an integer from 0 to 3.

17 Claims, No Drawings

POLYURETHANES

The present invention relates to ionomeric polyuretanes crosslinkable at room temperature characterized in giving coatings having improved properties of stain release, hydro- and oleo-repellence, antigraffiti, and they are very homogeneous even on porous materials. Besides, aqueous formulations of said ionomeric polyurethanes show an improved shelf life and pot life.

With shelf life it is meant the storage time of the formulation without alteration; with pot life it is meant the time available to apply the formulation to obtain the coating.

More specifically the present invention relates to ionomeric polyurethanes crosslinkable at room temperature containing (per) fluoropolyethers (PFPE) and silanol and/or alkoxysilane groups in the backbone.

In U.S. Pat. No. 4,746,550 in the name of the Applicant, perfluoropolyethers are described, which can have a termination of alkoxisilane type and are applied to stony materials to form coatings by applying solvent formulations of (chloro) fluorocarbon type. Said formulations have the drawback to use solvents not environment friendly since they have an impact on the ozone and/or on the G.W.P. (global warming potential). Besides, tests carried out by the Applicant have shown that in the presence of water said perfluoopolyethers have a very reduced pot life (some hours, less than one day). See the Comparative Examples. In U.S. Pat. No. 5,959,058 in the name of the Applicant, the synthesis of PFPE-based oligourethanes contaning alkoxysilane and hydroxylic groups is described. The drawback of said polymers resides in that they are not soluble in aqueous solvents, wherefore aqueous formulations cannot be obtained. Furthermore to carry out the crosslinking, an external crosslinking coadjuvant, e.g., melamine, is required. EP 1,130,005 in the name of the Applicant describes the use of bifunctional perfluoropolyethers, having also terminations of the alkoxisilane type, for the surface treatment of ceramic materials. For the application polar solvents containing a small amount of water are used. The drawback of these formulations is that the pot life is very low, less than one day. Furthermore these formulations have a high VOC (volatile organic compounds) whereby they are hardly marketable. Besides, also the application in closed environments requires special ventilation conditions. The Applicant has found that the stain release properties of the coatings obtained with said polymers are not high. See the comparative Examples. U.S. Pat. No. 6,313,335 describes ionomeric fluorinated polyurethanes which can also have perfluoropoly-ether units, having alkoxysilane groups as chain end groups, optionally diorganosiloxane groups in the chain. Said polyurethanes are used to prepare low surface energy coatings. The Applicant has found that fluorinated ionomeric polyurethanes having alkoxisilane groups on the chain terminals have not very good stain release properties. Besides the contact angles in water and hexadecane do not give a good homogeneity of surface treatment. See the comparative Examples. In patent application US2003/0168,783 polymers obtained by radical polymerization, containing silane groups, are described. The polymer is obtained by polymerization of at least three monomers of which one fluorinated, the other non fluorinated and the third containing an alkoxisilane group. As non fluorinated monomers, one can cite monomers containing carboxylic functions as, for example, (meth) acrylic acid, can also be used. The silicon atoms can be bound to substituents formed of hydrolyzable groups. The patent application exemplifies also fluorinated monomers containing a perfluoropolyether residue, obtained by reaction of (meth)acrylic acids with mono- or bi-functional perfluoropolyethers. Tests carried out by the Applicant have shown that by starting from monomers containing a double ethylenic unsaturation, for example bis(meth)acrylates, by radical reaction with unsaturated monomers, crosslinked polymers insoluble in solvents are obtained. Therefore it is not possible to obtain uncrosslinked polymers by radical polymerization by using as monomers bifunctional perfluoropolyethers and monomers containing silane groups. The polymers exemplified in said patent application give coatings showing not high contact angle values with water and hexadecane.

The need was felt to have available fluorinated ionomeric polyurethanes dispersible in water, capable to give formulations with a high shelf-life, and high pot life in application, and crosslinkable even at room temperature, forming coatings having the following combination of properties:
high hydro- and oleorepellence values;
improved stain release and antigraffiti properties;
homogeneity of the coating formed on the applied material, also in the case of porous materials, as shown by the specific water absorption as absolute value and as standard error of the absolute value.

An object of the present invention are polyurethanes-urea based on perfluoropolyethers comprising:
ionizable groups;
pendant groups along the polymeric backbone having the following structure:

wherein:
$R^I$ is alkylene from 1 to 10 carbon atoms, preferably from 1 to 5 carbon atoms, still more preferably from 2 to 4 carbon atoms;
$R^{II}$ is a linear or branched alkyl group from 1 to 4, preferably from 1 to 3 carbon atoms;
n is an integer from 0 to 3.

The polyurethanes of the present invention comprise units deriving from the following monomers:
a) (per) fluoropolyether diols having a number average moelcular weight from 400 to 5,000, preferably from 800 to 2,500;
b) diisocyanates selected from one or more of the following:

wherein R is a bivalent radical selected from the following:
$C_2$-$C_{12}$ aliphatic;
$C_6$-$C_{18}$ cycloaliphatic or alkylen-cycloaliphatic, wherein optionally the cycloaliphatic ring can be substituted with one or more $C_1$-$C_3$ alkyl groups, or
R contains two cyloaliphatic rings, each containing one of the NCO groups indicated in (IA), said rings joined together by a $C_1$-$C_6$ alkylene chain;
$C_6$-$C_{18}$ aromatic, wherein the aromatic ring can be substituted with one or more $C_1$-$C_3$ alkyl groups, or R contains two aromatic rings, each containing one of the NCO groups indicated in (IA), said rings joined together by a $C_1$-$C_6$ alkylene chain;
c) diols having an ionizable function, selected from the following:
c.0) diols having a carboxylic function, of the following general formula (IB):

wherein:
T is a linear or branched $C_2$-$C_{20}$, preferably $C_2$-$C_{10}$, trivalent aliphatic radical;
the two hydroxyls linked to T can replace also two different aliphatic chains of the trivalent radical, and they never are on the same carbon atom;
c.1) diols comprising an amine function, having formula (I.a):

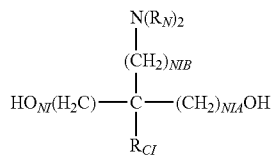

$R_N$ is a linear or branched $C_1$-$C_6$, preferably $C_1$-$C_4$ alkyl;
$R_{CI}$ is H or $C_1$-$C_4$ alkyl, NI is an integer and ranges from 1 to 4, NIA is an integer and ranges from 0 to 4, NIB is an integer and ranges from 1 to 4;
c.2) diols with amine group in the chain, having formula (I.b):

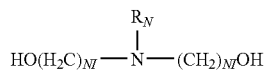

wherein $R_N$ and NI have the above mentioned meanings;
d) diamines containing in the molecule one silicon atom, having formula (I.d):

wherein:
$R_D$ is hydrogen or $C_1$-$C_3$ alkyl;
$R^0$, equal to or different from $R^I$, has the same meangins as $R^I$;
$R^I$ and $OR^{II}$ are as above;
e) optionally chain extenders, selected from $C_1$-$C_6$ aliphatic diols, for example diethylenglycol; $C_3$-$C_{10}$ cycloaliphatic, such as cyclohexyldimethanol, $C_6$-$C_{12}$ aromatic, hydroquinone bis (2-hydroxyethylether); $C_2$-$C_6$ aliphatic diamines, hydrazine.

The percent by weight of the monomers in the polyurethane, are the following:
a): 50%-85%, preferably 55%-75%;
b): 10%-40%, preferably 10%-30%;
c): 3%-10%, preferably 3%-7%;
d): 1%-12%, preferably 4%-10%;
e): 0-12%, preferably 1%-7%;

being 100% the sum of the components.

With ionizable groups, cationic and anionic groups are meant.

Preferably the amount of silane/silanol groups, expressed in equivalents of silicon/kg of polyurethane, ranges from 0.05 to 0.5 eq/Kg of polymer.

The (per)fluoropolyethers a) have one or more of the following units statistically distributed along the chain: $(C_3F_6O)$; $(CFYO)$ wherein Y is F or $CF_3$; $(CF_2CF_2O)$; $(CF_2(CF_2)_{x'}CF_2O)$ wherein x' is an integer equal to 1 or 2; $(CR_4R_5CF_2CF_2O)$ wherein: $R_4$ and $R_5$ are equal to or different from each other and selected between H, Cl, and one fluorine atom of the perfluoromethylene unit can optionally be substituted with H, Cl or (per)fluoroalkyl having, for example, from 1 to 4 carbon atoms.

The $(C_3F_6O)$ unit is selected between $(CF_2CF(CF_3)O)$ and $(CF(CF_3)CF_2O)$.

The preferred bifunctional compound of a) have the following structures:
(a') —$CF_2$—O—$(CF_2CF_2O)_{p'}(CF_2O)_{q'}$—$CF_2$—
wherein:
p' and q' are numbers such that the q'/p' ratio is between 0.2 and 4, p' being different from zero; and the number average molecular weight is in the above range;
(b') —CFY—O—$(CF_2CF(CF_3)O)_{r'}$—$(CF_2CF_2O)_{s'}$—$(CFYO)_{t'}$—CFY—
wherein:
Y is as above; r', s' and t' are numbers such that r'+s' is between 1 and 50, the ratio t'/(r'+s') is between 0.01 and 0.05, r'+s' being different from zero, and the number average molecular weight is in the above range;
(c') —$CF(CF_3)(OCF_2CF(CF_3))_{u'}$—$OR'_fO$—$(CF(CF_3)CF_2O)_{u'}(CF(CF_3))$—
wherein:
$R'_f$ is a $C_1$-$C_3$ perfluoroalkyl bifunctional radical; u' is a number such that the number average molecular weight is in the above range;
(c'') —CFYO—$(CFYO)_{r'}$—$((CF_3)CFCF_2O)_{r'}$—$R'_fO$—$(CF_2CF(CF_3)O)_{r'}$—$(CFYO)_{t'}$—CFY—
wherein:
$R'_f$ is a $C_1$-$C_3$ perfluoroalkyl bifunctional radical; r', t' and Y are as above; r' and t' such that the number average molecular weight is in the above mentioned range;
(d') —$CF_2CF_2O$—$(CF_2(CF_2)_{x'}CF_2O)_{v'}$—$CF_2CF_2$—
wherein:
v' is a number such that the molecular weight is in the above range, x' is an integer equal to 1 or 2;
(e') —$CF_2CH_2$—$(OCF_2CF_2CH_2)_{w'}$—$OR'_fO$—$(CH_2CF_2CF_2O)_{w'}$—$CH_2CF_2$—
wherein:
$R'_f$ is as above; w' is a number such that the number average molecular weight is in the above range;
the end groups being of the —$CH_2$—$(OCH_2CH_2)_{k'}$—OH type, wherein k' is a number between 0 and 6, preferably between 0 and 2.

The bifunctional (per)fluoropolyoxyalkylenes can be prepared starting from the corresponding (per)fluoropolyoxyalkylenes having —COF end groups (see for example the patents or patent applications GB 1,104,482, U.S. Pat. Nos. 3,715,378, 3,242,218, 4,647,413, EP 148,482, U.S. Pat. No. 4,523,039, EP 3-40,740, WO 90/03357, U.S. Pat. No. 3,810,874, EP 239,123, U.S. Pat. Nos. 5,149,842, 5,258,110).

Preferably the diisocyanates b) are selected from the following: hexamethylendiisocyanate (HDI), trimethylhexamethylenediisocyanate, isophoron diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or its isomers, xylylene diisocyanate, naphthalene-1,5-diisocyanate, p-phenylen-diisocyanate.

Examples of diols component c.0) are 2,2-dimethylolpropionic, dimethylolbutyric, dimethylolacetic acids; examples of diols component c.1) are 3-dimethylamino-1, 2-propandiol, 4-dimethylamino-1, 2-butandiol, 3-diethylamino-1, 2-propandiol; examples of diols component c.2) are methyldiethanolamine, butyldiethanolamine, methyldiisopropanolamine.

Examples of diamines component d) are:
N-(2-aminoethyl)-3-aminopropyltrimethoxysilane $NH_2$—$(CH_2)_2$—NH—$(CH_2)_3$—$Si(OCH_3)_3$, N-(2-aminoethyl)-2-aminoethyltrimethoxysilane, $NH_2$—$(CH_2)_2$—$NH$—$(CH_2)_2$—$Si(OCH_3)_3$, N-(3-aminopropyl)-3-aminopropyltrimethoxysilane $NH_2$—$(CH_2)_3$—$NH$—$(CH_2)_3$—$Si(OCH_3)_3$.

When the polyurethane is anionic, preferably the component c.0) is the 2,2-dimethylolpropionic acid; when the polyurethane is cationic, the preferred compound is c.1) in particular 3-dimethylamino-1, 2-propandiol.

The preferred diamine component d) is N-(2-aminoethyl)-3-aminopropyltrimethoxysilane.

The diamines component d), containing in the molecule one silicon atom are compounds available on the market.

The polyurethanes of the present invention are obtainable with processes which vary depending on the ionizable, anionic or cationi group present.

The anionic polyurethanes-urea of the present invention are obtained by a process comprising the following steps:

obtainment of the prepolymer by reaction of the perfluoropolyether diol component a) with component c.0) salified with a tertiary amine, for example triethylamine and the diisocyanate component b) in excess, working at a temperature between 20° C. and 40° C., at a dry product concentration higher than 80% by weight by using a solvent not containing in its molecule reactive hydrogen groups, partially or totally soluble with water as, for example, N-methylpyrrolidone, MEK, esters; the end of the reaction is determined by controlling the NCO titre according to ASTM D-2572;

the reaction mixture containing the prepolymer is dispersed in water at a temperature from 5° to 15° C. and a mixture is added of component d), diamines containing in the molecule one silicon atom, with the optional component e), for example $C_1$-$C_6$ aliphatic diamines and hydrazine; this step is carried out by using an amount of components d) and e) such that the meq. of the total aminic groups are in defect, for example of 2%, with respect to the NCO meq. of the prepolymer; the reaction is followed until the disappearance of the NCO group by IR at 2260 $cm^{-1}$.

During the prepolymer reaction, in the molecules of the diamines component d), the alkoxy groups which are bound to the silicon atom, coming into contact with water can partially or even totally hydrolyze. It is indeed known that the bond between the silicon atom and the alkoxy group is easily hydrolizable in water.

Therefore the ionomeric polyurethanes of the present invention can contain silanol groups or silanol groups together with alkoxy-silane groups.

The cationic polyurethanes-urea are prepared by the following process:

obtainment of the NCO ended bifunctional fluorinated prepolymer by reacting the bifunctional perfluoropolyethers component a) with the diisocyanates component b) in molar excess, at a temperature from 50° C. to 70° C. with a dry product content between 50% and 70% by weight by using organic solvents having the same properties described for the solvents used in the first synthesis step of the anionic polyurethanes;

the end of the reaction is determined by controlling the NCO titre according to ASTM D-2572;

maintaining the reaction mixture in the above temperature range, addition of a diol selected in the c.1) and/or c.2) groups, optionally in admixture with the aliphatic diols component e), in an amount such that the OH equivalents are in defect with respect to the NCO eq., finally determining again the NCO titre;

the reaction mixture is cooled to a temperature between 15° C. and 25° C. and component d) is added so that the total equivalents of aminic groups are equal to the NCO titre;

salification of the polymer obtained with organic acids as formic, acetic, lactic acid, etc. or by carrying out the quaternization of the tertiary aminic nitrogen atoms of the polyurethane with nitrogen alkylating agents known in the prior art, for example alkyl or benzyl bromides and iodides, as, for example, methyl iodide, dimethylsulphate, benzyl bromide, etc.; in case of the salification with acid, the acid is added to the reaction solution containing the polyurethane;

to the organic solution of the salified polymer water is added under stirring, by distilling the organic solvent under vacuum.

The dispersions in water of the polyurethanes of the present invention have a dry residue from 5% to 40% by weight, preferably from 20% to 30% by weight.

It has been found by the Applicant that the aqueous polyurethane dispersions of the present invention have an improved shelf life. As a matter of fact, even after storage for 6 months both at 4° C. and at 50° C., the appearance and the viscosity of the formulations does not change neither it is noticed formation of coagula or gels.

The formulations of the present invention can contain conventional additives as pigments, viscosity regulators, antifoam agents, UV stabilizers.

The formulations of the present invention are self-crosslinking. The crosslinking reaction takes place after the application of the formulation diluted to form the coating, in a wide range of temperatures ranging from +25° C. to +200° C. Known catalysts of the prior art are optionally added for the crosslinking of silane and/or silanol groups. See for example Kirk-Othmer "Encyclopedia of Chemical technology" vol. 22 pages 118-119.

The Applicant has found that also the dispersions of the present invention, aged at 50° C. for some months, for example 2-6 months, can be used to prepare coatings. The obtained hydro- and oleorepellence, stain release and antigraffiti properties, material coating homogeneity, substantially have the same values of the unaged formulations.

The applications of the formulations of the present invention on the substrate can be carried out by conventional methods: by spray, by dipping, by filmspreading bar, by brush, etc.

The substrate to which the formulations of the present invention are applied are, for example, metal, plastic or natural or synthetic rubber sections, facilities, bricks, building fronts, ceramic and stony materials; more generally all that must be protected from dirt, from aggressive agents, from graffiti made for example with inks, spray paints, colored chalks and by the decay due to atmospheric agents.

Furthermore the crosslinkable formulations of the present invention can be applied for surface treatments of skin and leather. For the last treatments the application temperature is generally not higher than 50° C. in order not to compromise the skin and leather integrity.

It has been unexpectedly and surprisingly found by the Applicant that, by using for the preparation of coatings on porous tiles an invention formulation, an easier stain release from the tiles is obtained. This datum is much more surprising since, if formulations of the prior art containing a polyurethane with the same equivalents of silane groups but located in the chain end position, are used, lower results are obtained. See the Examples.

It has furthermore been found by the Applicant that tiles treated with the formulations of the present invention show a specific water absorption which is about one third with respect to that determined on tiles treated with polyurethane formulations having silane groups in end position, the equivalents of silane groups in the two formulations being substantially equal.

It has been surprisingly and unexpectedly found that the comparison between the values preceded by ± reported in the Tables close to the specific absorption values, points out that the coating degree of the tile porous surface is more homogeneous in the case of coatings obtained with the formulation of the present invention. Indeed in the case of the specimens treated with the formulations of the present invention the value preceded by ± results about 1/50 with respect to the comparative value.

Furthermore the contact angles in water and hexadecane result improved, whereby the hydro- and oleorepellence properties are superior.

The following Examples are given for illustrative and not limitative purposes of the present invention.

EXAMPLES

Methods

Evaluation of the Stain Release Properties of Ceramic, Bricks, and Stony Materials Treated With the Samples To Be Tested The samples of the formulations to be tested are applied at room temperature (20° C.) on the materials by a brush, a roll or by immersion of the specimen in the formulation. In the case of porcelain gres the formulation excess can be removed by a cloth or by a brush.

The crosslinking of the polyurethane formulation coatings containing silane groups, terminal or in the chain, has been carried out at room temperature (20° C.) or at 160° C. for 3-4 min.

The treated specimen area had 5 cm×5 cm sizes. 3-4 specimens have been used for each treatment.

The treated surfaces are subjected to the following tests on the basis of the standard ISO 10545-14:1995.
Coloration with indelible marking pen Pentel®N 50.
Acid treatment with HCl 20% for 20 seconds of the treated surface followed by coloration with indelible marking pen Pentel®N 50.
Rubbing with rubber (shoe sole, bicycle and car tires).
Deposit of adhesive products used in building (Keracoll®, Mapei®).
Deposit of hematite powder ($Fe_2O_3$) as such or predispersed in oil.

The surfaces are initially cleaned with a cloth, at dry. If this treatment does not result sufficient, it is used, in the order:
a cloth wet with water,
a cloth wet with an aqueous solution of specific commercial detergents for ceramic, brick and stony materials, for example of Geal® or Fila® production,
a cloth soaked in alcohol or acetone.

The specimen surface is examined and the evaluation is carried out by a rating attributed on the basis of the following scale:
1 perfectly cleaned surface;
2 light halo;
3 halo;
4 stain as the untreated specimen.

Determination of the Specific Water Absorption By Imbibition (UNI 8942/3)

The specimen is conditioned at 105° C. until a constant weight ($G_1$), is put in distilled water head (head height: 1 cm) for 60 seconds. The water excess is removed from the brick by gravity (dropping) for 45 seconds. At the end the brick is weighed again ($G_2$).

The specific absorption E is given by the following formula:

$$\varepsilon = \frac{(G_2 - G_1)}{F_0}$$

wherein $F_0$ represents the area of the head support surface.
Five specimens are used for the test.

Determination of the Contact Angle With Water and Hexadecane

The measurements have been carried out by DSA Kruss instrument at room temperature (20° C). A liquid drop (water or hexadecane) is deposited on the treated surface and the contact angle is determined.

Determination of the Dry Residue

The determination has been carried out by weigh of the residue obtained starting from an exactly weighed dispersion amount (about 0.5-1 g), put in an open aluminum vessel and kept in a stove for 15 minutes at 150° C.

Evaluation of the Coating Antiqraffiti Properties

Some coloured signs are traced along the specimen width with indelible marking pens (Pentel NN50 type) of different colour (red, blue, black). The dirted specimens are conditioned in a stove for at least 30 min at 50° C.-60° C. A cotton flock soaked in methylated spirit is passed on the surface and one evaluates by comparison with an undirty specimen, attributing the following rating:
1 perfectly cleaned surface;
2 light halo;
3 halo;
4 stain equal to the initial one.

Determination of the Coating Chemical Resistance

The film chemical resistance has been evaluated rubbing cotton flock soaked of MEK or Ethanol at the frequency of 1 cycle/second and exerting a force of about 1 kg weight. It is determined how many strokes or cycles are necessary to remove the film according to AICC 23.

Determination of the Coating Hardness

The hardness has been determined as resistance to the incision of a series of Koh-I-Noor pencils having an increasing hardness according to ASTM D 3363.

Determination of the Coating Adhesion

The adhesion to the substratum of the polymeric films has been evaluated by dividing into squares by cut, and tear of standard adhesive tape according to the "cross cut test" described in ASTM D 3359.

Example 1

Synthesis of an anionic polyurethane-urea having a carboxylic functionality containing along the chain hydroxy/alkoxysilane pendant groups [—Si(OMe)$_x$(OH)$_{3-x}$], wherein x is an integer and ranges from 0 to 2, in an amount equal to 0.194 eq of Si/Kg of dry polymer 30 g of isophorondiisocyanate (IPDI), equal to 0.27 eq. NCO, and 61.5 g (0.081 eq OH) of linear perfluoropolyether with OH functionality (ZDOL) having formula as above defined and number average molecular weight 1,500 are fed, in sequence, in nitrogen atmosphere in a 100 ml reactor equipped with heating jacket, mechanical stirrer. The temperature is brought to 35° C. When the liquid mass has reached this temperature, one drops by dropping funnel in about 15 minutes a solution composed of 3.6 g. (0.054 eq OH) of dimethylolpropionic acid (DMPA), 2.6 g of triethylamine (TEA), equal to 0.0256 eq of amine, in 6.2 g of N-methylpyrrolidone (NMP). The mixture is maintained under stirring. After about 1.5 hours the NCO titre is determined according to ASTM D 2572 and it is found that all the hydroxyl groups have reacted and therefore the NCO titre corresponds to the theoretical titre. At this point the reaction mass temperature is increased to 40-45° C. and the prepolymer is slowly poured, in about 15 minutes, into a 1.5 litre reactor equipped with a rashton type stirrer and containing 230 g of water at the temperature of 15° C.

The urethane prepolymer is dispersed in the aqueous medium, then 4.5 g of N-(2-aminoethyl)-3-aminopropyltrimethoxysilane (AEAPTMS) equal to 0.04 eq aminic, and 2.4 of ethylendiamine (EDA) equal to 0.081 eq aminic, diluted in 10 g of water, are dropped. The reaction ends when by IR analysis it is observed the disappearance of the 2260 $cm^{-1}$ band relating to the NCO group.

A transparent clear blue aqueous dispersion is obtained.

The dispersion has pH 7 and dry residue 28.6% w/w.

The theoretical silicon content is of 0.194 equivalents of silicon/Kg of dry polymer.

Example 2

Synthesis of an anionic polyurethane-urea having a carboxylic functionality containing in the chain hydroxy/alkoxysilane pendant groups in an amount equal to 0.346 eq of Si/Kg of dry polymer.

The urethane prepolymer synthesis is repeated as described in the Example 1 and the subsequent dispersion in water.

At this point, in the aqueous dispersion of the prepolymer, 8.3 g, equal to 0.074 eq of aminic nitrogen, of AEAPTMS and 1.8 g equal to 0.06 aminic eq of EDA, diluted in 10 g of water are dropped to give a transparent clear blue dispersion.

The dispersion has pH 8 and dry residue 27.6% w/w.

The theoretical silicon content, expressed in equivalents of silicon/Kg of dry polymer, is 0.346 eq of Si/Kg of dry polymer.

Example 3

Synthesis of a cationic polyurethane-urea having an amine functionality containing in the chain pendant hydroxy/alkoxy-silane groups in an amount equal to 0.233 eq of Si/Kg of dry polymer. 14.6 g of IPDI equal to 0.13 eq of NCO, 50 g of linear perfluoropolyether with OH functionality (ZDOL) equal to 0.066 eq OH, having formula as above and number average molecular weight 1,500, and 7.2 g of MEK (methylethylkhetone) have been fed in sequence into a 250 ml 4-necked flask, equipped with mechanical stirrer, condenser, thermometer and dropper. The mass is heated to 50° C. and 73 µl of a dibutyltin dilaurate (DBTDL) solution in MEK having a 20% titre weight/volume are added. The reaction temperature is brought to 70° C. and it is maintained for about 1.5 h. The NCO titre has been controlled according to ASTM D 2572 and it is found that all the hydroxyl groups have reacted and therefore the NCO titre corresponds to the theoretical titre.

23 g of MEK are added and the reaction is cooled to 50° C. 2.4 g, equal to 0.033 eq OH of 3-N-diethylamino-1,2-propandiol are dropped. The temperature is brought again to 70° C., mantaining it until the end of the reaction, determined by the NCO titre. At this point the mixture is diluted with 37.3 g of MEK and it is cooled to 30° C.

Under strong stirring 3.6 g (0.033 eq of aminic nitrogen) of AEAPTMS are dropped. The reaction ends when by IR analysis the disappearance of the 2260 $cm^{-1}$ band relating to the NCO group is observed.

The polymer solution in MEK has a dry residue 49% w/w.

The theoretical silicon content, expressed in equivalents of silicon/kg of dry polymer, is 0.233 eq of Si/Kg of dry polymer.

107.5 g of polymer solution in MEK equal to 52.7 g of polymer have been fed into a 250 ml 3-necked flask, equipped with half-moon mechanical stirrer. The temperature is brought to 35° C. and under stirring 0.73 g of acetic acid have been added. 158 g of water are then added by dropping to the organic solution of the salified polymer. The organic solvent is removed by stripping obtaining an aqueous dispersion, having an opalescent appearance, pH 5.3, dry residue of 25% w/w.

Example 4 (Comparative)

Synthesis of an anionic polyurethane having a carboxylic functionality containing on the chain terminals hydroxy/alkoxysilane groups in an amount equal to 0.181 eq of Si/Kg of dry polymer.

29.1 g of IPDI equal to 0.2028 eq of NCO; 100 g equal to 0.13 eq OH of ZDOL having formula as above and number average molecular weight 1,500, and 14.3 g of ethylacetate have been fed, in sequence, into a 500 ml 4-necked flask. The temperature is brought to 50° C. and 144 µl of a DBTDL solution in MEK having 20% titre weight/volume are added.

After the addition the reaction temperature is increased to 70° C. maintaining it constant for about 1.5 h. The reaction ends when the NCO titre, determined according to ASTM D 2572, becomes constant.

46.2 g of ethylacetate are added and it is cooled to 50° C. 7.05 g, equal to 0.11 eq OH, of DMPA are added and 4 g equal to 0.039 eq of aminic nitrogen of TEA are dropped. The temperature is brought to 60° C. and it is maintained until the end of the reaction controlled by NCO titre. Then the reaction mixture is cooled to 30° C. and under strong stirring 5.1 g equal to 0.026 aminic eq of 3—(methylaminopropyltrimethoxysilane) (MAPTMS) are dropped. The reaction ends when by IR analysis the disappearance of the 2260 $cm^{-1}$ band relating to the NCO groups is observed.

The polymer solution in ethyl acetate has a dry residue of 70.1% w/w.

36.3 g of polymer solution in ethyl acetate, equal to 25.4 g of polymer, and 0.76 g of methanol have been fed into a 250 ml 3-necked flask, equipped with half-moon mechanical stirrer. The temperature is brought to 35° C. and under stirring 76.3 g of water are dropped. The organic solvent is removed by stripping obtaining an aqueous dispersion, having an opalescent appearance, pH 7.51 and dry residue 28.8% w/w.

The theoretical silicon content, expressed in equivalents of silicon/kg of dry polymer, is 0.181 eq of Si/Kg of dry polymer.

Example 5 (Comparative)

Synthesis of an anionic polyurethane having a carboxylic functionality containing on the chain terminals hydroxy/alkoxysilane groups in an amount equal to 0.186 eq of Si/Kg of dry polymer.

52.6 g of IPDI equal to 0.473 eq NCO, 180 g (0.2365 eq OH) of ZDOL having formula as above and number average molecular weight 1,500, and 25.8 g of ethylacetate have been fed, in sequence, into a 500 ml 4-necked flask. The temperature is brought to 50° C. 263 µl of a DBTDL solution in MEK having 20% titre weight/volume are added.

After the addition the reaction temperature is increased to 70° C. maintaining it constant for about 1.5 h. The reaction ends when the NCO titre determined according to ASTM D 2572 becomes constant. 60.9 g of ethylacetate are added and it is cooled to 50° C. 6.3 g, equal to 0.095 eq OH of DMPA are added and 3.83 g (0.038 eq of aminic nitrogen) of TEA and then 6.8 g (0.095 eq OH) of cyclohexyldimethanol (CHDM) are dropped in sequence.

The temperature is brought to 60° C. and it is maintained until the end of the reaction controlled by NCO titre. Then the reaction mixture is cooled to 30° C. and under strong stirring 9.1 g (0.047 eq of aminic nitrogen) of MAPTMS are dropped (ref. Example 4 (comparative)). The reaction ends when by IR analysis the disappearance of the 2260 cm$^{-1}$ band relating to the NCO group is observed. At this point 3 g of methanol are added.

The polymer solution in ethyl acetate has a dry residue 64.1% w/w.

50 g of the organic solution equal to 32.4 g of polymer have been fed into a 250 ml 3-necked flask, equipped with half-moon mechanical stirrer. 3.2 g of isopropanol (IPA) are added and the solution temperature is brought to 35° C. Under stirring 96.3 g of water are dropped and the organic solvent is removed by stripping. An aqueous dispersion, having an opalescent appearance, pH 8.4 and dry residue 25% w/w is obtained.

The theoretical silicon content, expressed in equivalents of silicon/kg of dry polymer, is 0.186 eq of Si/Kg of dry polymer.

Example 6 (Comparative)

Synthesis of a cationic polyurethane having an amine functionality containing on the chain terminals hydroxy/alkoxysilane groups in an amount equal to 0.187 eq of Si/Kg of dry polymer.

59.1 g of IPDI (0.53 eq NCO); 202.5 g (0.27 eq OH) of the same compound ZDOL used in the previous Examples, and 87 g of ethylacetate have been fed, in sequence, into a 500 ml 4-necked flask. The temperature is brought to 50° C. 295 µl of a DBTDL solution in MEK having 20% titre weight/volume are added. After the addition the reaction temperature is increased to 70° C. maintaining it constant for about 1.5 h. The reaction ends when the NCO titre determined according to ASTM D 2572 becomes constant. 7.5 g of ethylacetate are added and it is cooled to 50° C. 7.8 (0.11 eq OH) of 3-N-diethylamino-1,2-propandiol are dropped. The temperature is brought again to 70° C. The reaction ends when the NCO titre remains constant.

It is cooled to 30° C. and under strong stirring 10.2 g (0.053 eq of aminic nitrogen) of MAPTMS are dropped (ref. Example 4 (comparative)). The reaction ends when by IR analysis the disappearance of the 2260 cm$^{-1}$ band relating to the NCO group is observed. 3 g of methanol are added.

The organic polymer solution has a dry residue 68.8% w/w.

70 g of the organic polyurethane solution, corresponding to 48.16 g of polymer, have been fed into a 250 ml 3-necked flask, equipped with half-moon mechanical stirrer, 3.8 g of IPA have been added and the temperature was brought to 35° C. Under stirring 0.54 g of acetic acid and then 144 g of water have been dropped. After stripping of the organic solvent an aqueous dispersion, having a lactescent appearance, pH 4 and dry residue 25% w/w and containing isopropanol at a concentration 2.6% w/w was obtained.

The theoretical silicon content, expressed in equivalents of silicon/kg of dry polymer, is 0.187 eq of Si/Kg of dry polymer.

Example 7 (Comparative)

Synthesis of a linear cationic polyurethane not containing alkoxysilane groups, having —NCO groups blocked with butanone oxime according to EP 1,327,644

274.07 g of IPDI (2 moles with respect to PFPE) dissolved in 503.2 g of anhydrous ethyl acetate are fed into a 2 l glass reactor equipped with mechanical stirring, thermometer, reflux condenser and maintained under nitrogen. The solution is heated to 70° C., 3.9 ml of a solution at 20% w/w of DBTDL are added and 900 g of perfluoropolyether diol (Fomblin® ZDOL) having hydroxyl equivalent weight 730 are dropped in two hours. It is let react for another hour and lastly the NCO titre is measured as in the Example 2.

The reaction temperature is brought to 55° C. and a mixture of 21.11 g (0.5548 eq OH) of 1,2 propandiol and of 33.05 g (0.5548 eq OH) of 3-dimethylamino 1,2-propandiol (0.45 moles of each dialcohol with respect to PFPE) are dropped in about 30 minutes in 23.18 g of ethyl acetate. It is left under stirring for about 5 h. Lastly the NCO titre is measured. On an aliquot (A) of the obtained polymer the number average molecular weight is determined as above which is 25,000.

At the temperature of 70° C. a solution of butanone oxime 10.74 g (0.123 eq) (0.1 moles with respect to PFPE) is dropped in 4.61 g of ethyl acetate. The reaction mixture is left under stirring until disappearance of the NCO band (2270 cm–1 by IR spectroscopy).

It is cooled to room temperature and acetic acid (19.97 g) dissolved in NMP (124 g) is added, it is left under stirring for 30 minutes, then it is transferred in a 5 litre flask and 2,900 g of distilled water are added in one hour under strong stirring (500 rpm), until obtaining a cationic polymeric dispersion in water/organic solvent mixture. The ethyl acetate is then removed by evaporation (40° C., 50 mm Hg, 6,67 KPa), obtaining a substantially aqueous polymeric dispersion at 30% w/w.

Example 8 (Comparative)

Synthesis and crosslinking with epoxysilane of an anionic polyurethane not containing alkoxysilane groups, prepared acording to European patent application No. 03011988.7 obtained by starting from a (per)fluoropolyether diol having number average molecular weight 1,500

850 g of isophorondiisocyanate (IPDI), 937 g of methylethylketone (MEK), 2,900 g of (per) fluoropolyether diol (ZDOL) having number average molecular weight Mn 1,500 and the following structure:

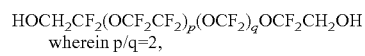
wherein p/q=2, are transferred into a 10 litre reactor, equipped with mechanical stirrer, reflux condenser, thermometer and charging hopper.

The mixture is heated to 50° C. under stirring, then 0.420 g of dibutyltin dilaurate (DBTDL) are added and it is brought to 65° C. for 120 minutes. Lastly on a sample of the reaction mixture the residual —NCO groups are titred, which are 3.4% on the dry product.

251 g of MEK and, under strong stirring, 270 g of dimethylolpropionic acid (DMPA), which is solubilized in the reaction mixture by dropping 200 g of triethylamine (TEA), are added. The heating is continued at 65° C. for 6 hours. Finally the reaction completion is checked by IR spectroscopy (disappearance of the —NCO band at 2260 cm$^{-1}$).

The polymer solution is then cooled to 40° C. and diluted with 825 g of isopropanol (IPA), and dropped in one hour in a 30 litre second reactor equipped with Rashton type stirrer at 200 rpm and containing 12 litres of H$_2$O.

After distillation of the volatile solvent at the temperature of 50° C., by using a vacuum of 80-100 mbar (8.10$^3$ Pa-1.10$^4$ Pa), about 16 Kg of dispersion are obtained.

3.5 g of the crosslinking agent β-(3,4-epoxycyclohexyl) ethyltriethoxysilane (CoatOSil® 1770, Witco) and 0.7 ml of a catalyst solution (Imicure® EMI-24—Air Products) at 5% weight/volume in water have been added to 40 g of dispersion (dry product 25.5%). The mixture is maintained at room temperature under stirring for 15 min.

The dispersion containing the crosslinking agent is applied by spray on chromium-plated aluminum panels and on glass panels.

The obained coatings have been subjected to the following crosslinking cycle: 30 min at 50° C.+5 days at room temperature (20° C.).

Example 9 (Comparatative)

Aqueous formulation of a bifunctional perfluoropolyether (PFPE) phosphate according to EP 1,130,005

The compound is commercially available in hydroalcoholic solution with the trademark Fluorolink® TLS 5018 having the following % composition by weight: 57% water, 33% isopropyl alcohol, 10% PFPE phosphate.

The PFPE phosphate is bifunctional and is prepared as described in EP 1,130,005. The PFPE phosphate bifunctional contained in the commercial product Fluorolink® is a mixture of the following structures:

(HO)$_2$(O)PO(C$_2$H$_4$O)$_p$CH$_2$CF$_2$O(C$_2$F$_4$O)$_n$(CF$_2$O)$_m$
CF$_2$CH$_2$(OC$_2$H$_4$)$_p$OP(O)(OH)$_2$;     1)

[(HO)$_2$(O)PO(C$_2$H$_4$O)$_p$CH$_2$CF$_2$O(C$_2$F$_4$O)$_n$(CF$_2$O)$_m$
CF$_2$CH$_2$(OC$_3$H$_4$)$_p$O]$_2$P(O)(OH);     2)

wherein p=1-4, n=2-4, m=2-6, wherein compound 1) represents 90% by moles and compound 2) 10% by moles.

Example 10 (Comparative)

Preparation of an alcoholic/aqueous formulation of a bifunctional perfluoropolyether (PFPE) silane according to EP 1,130,005

The bifunctional perfluoropolyether (PFPE) silane used has the following formula:

(C$_2$H$_5$O)$_3$Si (CH$_2$)$_3$HNOC—CF$_2$O(CF$_2$CF$_2$O)$_m$
(CF$_2$O)$_n$CF$_2$—CONH(CH$_2$)$_3$Si(OC$_2$H$_5$)$_3$, wherein n=2-4, m=2-6.

The compound is commercially available as pure product with the trademark Fluorolink® S10.

The formulation having the following composition (per cent by weight): 3% water, 86% isopropyl alcohol, 1% HCl 10%, 10% perfluoropolyether silane, is prepared.

The formulation must be used immediately after its preparation since the pot life is very limited.

Example 11 (Comparative)

Synthesis of an oligourethane containing end silane groups in solvent and subsequent formulation with melamine according to U.S. Pat. No. 5,959,058

Example 8 of U.S. Pat. No. 5,959,058 was repeated.

100 g of polyol (P$^2$) having formula:

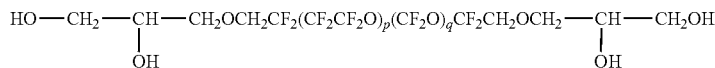

p/q=0.84, n=0, Mn 950 (number average molecular weight) and functionality 1.93, are fed into a 3-necked flask equipped with dropping funnel, condenser and mechanical stirrer.

30 ml of anhydrous butyl acetate are added, it is heated to 100° C. adding 3 drops of DBTDL at 5% in butyl acetate and 21.8 g of isocyanatepropyltriethoxysilane (Y-9030, Uinion Carbide) are slowly added.

The disappearance of the NCO groups absorption is followed by I.R. Lastly the solvent is evaporated recovering 194 g of a mixture formed of the starting polyol and of the following compounds (IX) and (X):

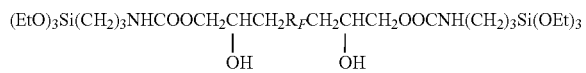

A bicomponent formulation is prepared formed of the reaction mixture containing the compounds (IX) and (X) and of melamine (Cymel-325). The two components are mixed for the application and the subsequent crosslinking.

Example 12 (Comparative)

Preparation of a monocomponent formulation in solvent according to U.S. Pat. No. 6,071,564 containing PFPE diols reacted with IPDI trimer in stoichiometric excess and preparation of coatings on aluminum and glass.

The Example 7 of U.S. Pat. No. 6,071,564 was repeated.

A composition was prepared containing 91.0 parts by weight of fluorinated resin obtained by reaction between Z DOL and isocyanurate from IPDI Vestanat 1980/100 (Huls), having final equivalent weight 1,200 and isocyanic NCO functionality 3.5, 5.5 parts by weight of mixture. of catalysts DABCO/DBTDL (Fluka 10% in PMA), 3.5 parts of mixture of UV stabilizers Tinuvin 1130/Tinuvin 292 2/1 (Ciba) at 50% by weight in PMA. The solid percentage of the formulation is 55%, the solvents being "to complement" in a ratio by weight 30/70 butyl acetate/Solvesso (See the Example 7 of U.S. Pat. No. 6,071,564)

The formulation was applied on supports of aluminum chromium-plated Q-panel type. After the solvent evaporation at room temperature for 15 minutes, the crosslinking was carried out by heating in a stove at 60° C. for 24 hours under relative humidity conditions 100%. The process was followed by monitoring the NCO band disappearance by IR spectroscopy.

Example 13

Evaluation of the stain release properties of a coating on smooth porcelain gres obtained from the formulation of the Example 1.

The method has been used to evaluate the stain release properties described in the general part. A coating on smooth porcelain gres tiles was obtained by using the formulation of the Example 1, containing an anionic polyurethane with pendant silane groups, diluted with IPA and water so to obtain the following composition: 10% dry polyurethane, 30% IPA and 60% water. The crosslinking was carried out at room temperature. The stain release property was then evaluated using each of the treatments considered in the method.

The results are reported in Table 1.

Examples 14-16 (Comparative)

The Example 13 was repeated but by using the formulations, respectively, of the following Examples:

Example 14 Comp the formulation of the Example 9 comp containing PFPE phosphates bifunctional, diluted, as described, at 10% by weight of PFPE phosphate bifunctional;

Example 15 Comp the formulation of the Example 10 comp containing PFPE silanes bifunctional, diluted, as described, at 10% perfluoropolyether silane;

Example 16 Comp the formulation of the Example 4 comp containing an anionic polyurethane with bifunctional silane terminals, diluted as described in the Example 13 (10% by weight of anionic polyurethane).

The crosslinking was carried out at room temperature (20° C.).

The results are reported in Table 1.

Comments to Table 1

Table 1 shows that the artificial dirt is more easily removed from the tiles coated with the coating obtained with the formulation of the application Example 13 (formulation of the Example 1). In particular the Table shows that the stain release properties of the coating of the Example 13 are clearly better than those of the coating obtained with the formulation of the application Example 16 comp (formulation of the Example 4 comp) containing an anionic polyurethane with bifunctional silane end groups.

Example 17

Evaluation of the static contact angle with water and hexadecane of a coating on a RDB® brick, obtained from the formulation of the Example 3 and determination of the specific water absorption.

The aqueous formulation of the Example 3, containing 25% by weight of a cationic polyurethane with pendant silane groups, was diluted at a 1% concentration of polyurethane with water.

The application was carried out by immersion of the specimen in the formulation for 4 seconds, followed by drying of the piece at air. The bricks had 4 cm×4 cm×6 cm sizes.

The obtained results are reported in Table 2.

Examples 18-20 (Comparative)

The Example 17 was repeated but by using the formulations, respectively, of the following Examples:

Example 18 Comp the formulation of the Example 9 comp containing PFPE phosphates bifunctional, diluted at 1% by weight of PFPE phosphate bifunctional by adding water;

Example 19 Comp the formulation of the Example 7 comp containing PFPEs having blocked CNO groups, diluted at 1% by weight of polyurethane by adding water;

Example 20 Comp the formulation of the Example 6 comp containing a cationic polyurethane with bifunctional silane terminals, diluted at 1% by weight by adding water.

The crosslinking was carried out at room temperature (20° C.).

The results are reported in Table 2.

Comments to Table 2.

The determination of the specific absorption in the comparative Examples shows that the standard error is comparable with the average value of the measurement obtained in each Example. This shows that the coating degree of the porous brick surface obtainable with the coatings of these Examples is not homogeneous on the whole surface. In the Example 17 according to the present invention the water absorption degree is much lower than that obtained in the specimens of the comparative Examples. Besides the standard error is about 50 times lower with respect to the average value of the measurement. This shows that the brick treatment with the formulations of the compounds of the present invention allows to obtain a more homogeneous coating compared with the comparative compounds of the prior art.

The contact angle values in water and hexadecane obtained with the coating of the Example 17 according to the present invention are very high and higher than those of the coatings of the Examples 18-20 comp. In particular the oleo-repellence value is, on average, higher than about 20% with respect to the corresponding values of the coatings of the Examples 18-20 comp.

Example 21

Determination of the following properties: chemical resistance, adhesion, hardness and antigraffiti of a coating obtained with the dispersion of the Example 2 containing an anionic polyurethane according to the present invention.

The dispersion of the Example 2 has been applied by spray on specimens of aluminum chromium-plated and on glass panels.

The crosslinking was carried out at room temperature (20° C.).

A coating was obtained having a thickness between 20 and 40 μm and the properties are reported in Table 3.

Example 22 (Comparative)

The determinations indicated in the Example 21 were repeated on a coating applied to chromium-plated aluminum, obtained by spray application of the bicomponent composition of the Example 11 (comparative), constituted by melamine and bifunctional PFPE silane.

The crosslinking has required the following conditions: 220° C. for 5 minutes.

A coating is obtained having a thickness between 20 and 40 μm and the properties reported in Table 3.

Example 23 (Comparative)

The determinations indicated in the Example 21 were repeated on a coating obtained from the formulation of the Example 8 (comparative), containing an anionic polyurethane and epoxysilane, spray applied on aluminum chromium-plated and glass specimens and then crosslinked as described in the Example 8 (comparative).

A coating is obtained having a thickness between 20 and 40 μm and the properties reported in Table 3.

Example 24 (Comparative)

The determinations indicated in the Example 21 were repeated on a coating obtained from the monocomponent formulation in solvent of the Example 12 (comparative), containing PFPE diols reacted with IPDI trimer, spray applied to chromium-plated aluminum specimens and crosslinked as described in the Example 12 (comparative).

A coating is obtained having a thickness between 20 and 40 μm and the properties reported in Table 3.

Comments to Table 3

The Table shows that the coating of the invention formulation (Example 21) has antigraffiti properties, hardness, chemical resistance and adhesion equal to those of the coating obtained with the anhydrous formulations of the prior art according to U.S. Pat. No. 5,959,058 (Example 22 (comparative)) containing non ionomeric polyurethanes with silane end groups and hydroxyl groups in the chain, crosslinked with melamine. The invention compositions have the advantage, as said, that they are formulated in aqueous solvents and do not require external crosslinking agents. Differently from the formulations of the prior art, stable only in the absence of the melamine crosslinking agent, a critical factor for the pot life of the composition, the aqueous dispersions of the ionomeric polyurethanes of the present invention are monocomponent, self-crosslinking, have a high pot life and are ready to use.

TABLE 1

Evaluation of the stain release properties of the coatings on smooth porcelain gres tiles obtained in the following application Examples: Ex. 13 according to the invention, wherein the formulation of the Ex. 1 is used; Ex. 14 comp, relating to the composition of the Ex. 9 comp containing PFPE phosphates; Ex. 15 comp, relating to the formulation of the Ex. 10 comp containing bifunctional PFPE silanes; Ex. 16 comp, relating to the formulation of the Ex. 4 comp containing an anionic polyurethane with bifunctional silanes end groups. In the Table the column N.T. refers to the evaluation of the stain release on untreated tiles. The rating is that described in the method (see the Examples).

| Treatment | N.T. | Ex. 13 | Ex. 14 comp | Ex. 15 comp | Ex. 16 comp |
|---|---|---|---|---|---|
| marking pen Pentel ® N 50 | 4 | 1 | 1 | 2 | 2 |
| marking pen Pentel ® N 50 after acid treatment | 4 | 1 | 2-3 | 3 | 2 |
| deposit of adhesive products | 4 | 1 | 1 | 2-3 | 1 |
| rubbing with rubber | 4 | 1 | 2 | 2 | 2 |
| deposit of hematite powder | 4 | 1-2 | 2 | 1-2 | 1-2 |

TABLE 2

Evaluation of the static contact angle with water and hexadecane of coatings on RDB ® brick, obtained by immersion of specimens in the formulations used in the following application Examples: Ex. 17 (formulation of the Ex. 3 according to the present invention); Ex. 18 comp (formulation of the Ex. 9 comp); Ex. 19 comp (formulation of the Ex. 7 comp); Ex. 20 comp (formulation of the Ex. 6 comp). On the same samples the specific water absorption has been determined.

| | Examples | Contact Angle (°) $H_2O$ | Contact Angle (°) Hexadecane | $H_2O$ Spec. Absorption (UNI 8942/3) |
|---|---|---|---|---|
| Untreated specimen | | not det. | not det. | 38 ± 1 |
| Ex. 17 | (coating from formulation with cationic PU) | 130-135 | 110-120 | 0.44 ± 0.01 |
| Ex. 18 comp | (coating from formulation with bifunctional PFPE phosphates) | 119 | 93 | 3 ± 2 |
| Ex. 19 comp | (coating from formulation with PFPE having blocked CNO groups) | 121 | 95 | 2 ± 0.5 |

TABLE 2-continued

Evaluation of the static contact angle with water and hexadecane of coatings on RDB ® brick, obtained by immersion of specimens in the formulations used in the following application Examples: Ex. 17 (formulation of the Ex. 3 according to the present invention); Ex. 18 comp (formulation of the Ex. 9 comp); Ex. 19 comp (formulation of the Ex. 7 comp); Ex. 20 comp (formulation of the Ex. 6 comp). On the same samples the specific water absorption has been determined.

| Examples | | Contact Angle (°) | | $H_2O$ Spec. Absorption (UNI 8942/3) |
|---|---|---|---|---|
| | | $H_2O$ | Hexadecane | |
| Ex. 20 comp | (coating from formulation with cationic PU with bifunctional silane end groups) | 125 | 95 | 1.5 ± 0.5 |

TABLE 3

Evaluation of the chemical resistance, adhesion, hardness and antigraffiti properties of the coatings obtained in the Ex. 21 (formulation of the Ex. 2 according to the invention), and of the Ex. 22-24 comp, wherein the formulations of the Ex. 11 comp, 8 comp and 12 comp are, respectively, used.

| Examples | Chemical resistance (Double strokes MEK) | Adhesion (cross cut test) | Antigraffiti (score) | Hardness (pencil) |
|---|---|---|---|---|
| 21 | >200 | 100% | 1 | F |
| 22 comp | >200 | 100% | 1 | F |
| 23 comp | >100 | 100% | 2 | HB |
| 24 comp | >200 | 100% | 1 | H |

The invention claimed is:

1. Polyurethanes-urea based on perfluoropolyethers comprising:
    ionizable groups; and
    pendant groups along the polymeric chain backbone having the following structure:

$$—R^I—Si(OR^{II})_n(OH)_{3-n} \quad (I)$$

wherein $R^I$ is an alkylene having from 1 to 10 carbon atoms, $R^{II}$ is a linear or branched alkyl group having from 1 to 4, and n is an integer from 0 to 3.

2. Polyurethanes according to claim 1, comprising units derived from the following monomers:
    a) (per) fluoropolyether diols having a number average moelcular weight from 400 to 5,000;
    b) diisocyanates selected from one or more of the following:

$$OCN—R—NCO \quad (IA)$$

wherein R is a bivalent radical selected from the following:
    $C_2$-$C_{12}$ aliphatic;
    $C_6$-$C_{18}$ Cycloaliphatic or alkylen-cycloaliphatic, wherein optionally the cycloaliphatic ring can be substituted with one or more $C_1$-$C_3$ alkyl groups, or
    R contains two cyloaliphatic rings, each containing one of the NCO groups indicated in (IA), said rings joined together by a $C_1$-$C_6$ alkylene chain;
    $C_6$-$C_{18}$ aromatic, wherein the aromatic ring can be substituted with one or more $C_1$-$C_3$ alkyl groups, or
    R contains two aromatic rings, each containing one of the NCO groups indicated in (IA), said rings joined with each other by a $C_1$-$C_6$ alkylene chain;

c) diols having an ionizable function, selected from the following:
    c.0) diols having a carboxylic function, of the following general formula:

    (IB)

wherein
    T is a linear or branched $C_2$-$C_{20}$, trivalent aliphatic radical;
    the two hydroxyls linked to T can replace also two different aliphatic chains of the trivalent radical, and they never are on the same carbon atom;

c.1) diols comprising an amine function, having formula:

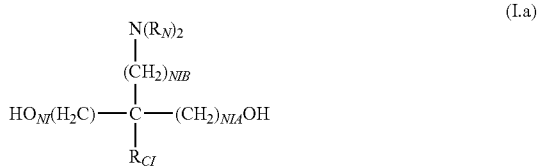
    (I.a)

wherein $R_N$ is a linear or branched $C_1$-$C_6$ alkyl, $R_{CI}$ is H or $C_1$-$C_4$ alkyl, NI is an integer and ranges from 1 to 4, NIA is an integer and ranges from 0 to 4, NIB is an integer and ranges from 1 to 4;

c.2) diols with amine group in the chain, having formula:

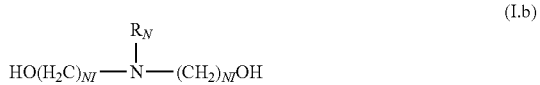
    (I.b)

wherein $R_N$ and NI have the above meanings;

d) diamines containing in the molecule one silicon atom, having formula:

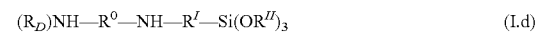
    (I.d)

wherein:
    $R_D$ is hydrogen or $C_1$-$C_3$ alkyl;
    $R^0$, equal to or different from $R^I$, has the same meanings as $R^I$;
    $R^I$ and $OR^{II}$ are as above;

e) optionally chain extenders, selected from $C_1$-$C_6$ aliphatic diols; $C_3$-$C_{10}$ cycloaliphatics, $C_6$-$C_{12}$ aromatic, hydroquinone bis(2-hydroxyethylether); $C_2$-$C_6$ aliphatic diamines, and hydrazine.

3. Polyurethanes according to claim 2, wherein the percentages by weight of the monomers in the polyurethane, are the following:
   a) 50%-85%;
   b) 10%-40%;
   c) 3%-10%;
   d) 1%-12%; and
   e) 0-12%,
   wherein the sum of the components is 100%.

4. Polyurethanes according to claims 2, wherein the diamines component d) are selected from the group of the following compounds:
   N-(2-aminoethyl)-3-aminopropyltrimethoxysilane
   $NH_2$—$(CH_2)_2$—NH—$(CH_2)_3$—$Si(OCH_3)_3$,
   N-(2-aminoethyl)-2-aminoethyltrimethoxysilane, $NH_2$—$(CH_2)_2$—NH—$(CH_2)_2$—$Si(OCH_3)_3$,
   N-(3-aminopropyl)-3-aminopropyltrimethoxysilane
   $NH_2$—$(CH_2)_3$—NH—$(CH_2)_3$—$Si(OCH_3)_3$.

5. Polyurethanes according to claim 4, wherein the diamine component d) is N-(2-aminoethyl)-3-aminopropyltrimethoxysilane.

6. Polyurethanes according to claims 1, wherein the amount of groups of formula (I), expressed in equivalents of silicon/kg of polyurethane, ranges from 0.05 to 0.5 eq/Kg of polymer.

7. Polyurethanes according to claims 1, wherein the bifunctional (per)fluoropolyethers indicated in a) have one or more of the following units statistically distributed along the chain: $(C_3F_6O)$; (CFYO) wherein Y is F or $CF_3$; $(CF_2CF_2O)$; $(CF_2,(CF_2)_{x'}CF_2O)$ wherein x' is an integer equal to 1 or 2; $(CR_4R_5CF_2CF_2O)$ wherein $R_4$, and $R_5$ are equal to or different from each other and selected between H, Cl, and one fluorine atom of the perfluoromethylene unit can optionally be substituted with H, Cl or (per)fluoroalkyl having, for example, from 1 to 4 carbon atoms.

8. Polyurethanes according to claim 7, wherein the $(C_3F_6O)$ unit is selected between $(CF_2CF(CF_3)O)$ and $(CF(CF_3)CF_2O)$.

9. Polyurethanes according to claim 7, wherein the bifunctional compounds a) have the following perfluoro-oxyalkylene structures:
   (a') —$CF_2$—O—$(CF_2CF_2O)_{p'}(CF_2O)_{q'}$—$CF_2$—
   wherein:
   p' and q' are numbers such that the q'/p' ratio is between 0.2 and 4, p' being different from zero; and the number average molecular weight is in the above range;
   (b') —CFY—O—$(CF_2CF(CF_3)O)_{r'}$—$(CF_2CF_2O)_{s'}$—$(CFYO)_{t'}$—CFY—
   wherein:
   Y is as above; r', s' and t' are numbers such that r'+s' is between 1 and 50, the ratio t'/(r'+s') is between 0.01 and 0.05, r'+s' being different from zero, and the number average molecular weight is in the above range;
   (c') —$CF(CF_3)(OCF_2CF(CF_3))_{u'}$—$OR'_fO$—$(CF(CF_3)CF_2O)_{u'}(CF(CF_3))$—
   wherein:
   $R'_f$ is a $C_1$-$C_3$ perfluoroalkyl bifunctional radical; u' is a number such that the number average molecular weight is in the above range;
   (c") —CFYO—$(CFYO)_{r'}$—$((CF_3)CFCF_2O)_{r'}$—$R'_fO$—$(CF_2CF(CF_3)O)_{r'}$—$(CFYO)_{r'}$—CFY— wherein:
$R'_f$ is a $C_1$-$C_3$ perfluoroalkyl bifunctional radical; r', t' and Y are as above; r' and t' such that the number average molecular weight is in the above range;
(d') —$CF_2CF_2O$—$(CF_2(CF_2)_{x'}CF_2O)_{v'}$—$CF_2CF$—
wherein:
v' is a number such that the molecular weight is in the above range, x' is an integer equal to 1 or 2;
(e') —$CF_2CH_2$—$(OCF_2CF_2CH_2)_{w'}$—$OR'_fO$—$(CH_2CF_2CF_2O)_{w'}$—$CH_2CF_2$—
wherein:
$R'_f$ is as above; w' is a number such that the number average molecular weight is in the above range;
the end groups of the bifunctional perfluoropolyethers component a) being of the —$CH_2$—$(OCH_2CH_2)_{k'}$—OH type, wherein
k' is a number between 0 and 6.

10. Polyurethanes according to claim 1, wherein the amount of silane or silanol groups, expressed in equivalents of silicon/kg of polyurethane, ranges from 0.05 to 0.5 eq/kg.

11. Formulations containing the polyurethanes of claims 1.

12. Formulations according to claim 11 comprising additives selected from pigments, viscosity regulators, antifoam agents, UV stabilizers.

13. Coatings obtained by applying on substrates the formulations of claim 11.

14. A method of coating polyurethanes on substrates comprising the step of applying on the substrates the polyurethane formulations of claim 11 are used.

15. The method according to claim 14, wherein the substrates are selected from the group consisting of metals, plastic or natural or synthetic rubber sections, bricks, ceramic and stony materials, skins and leather.

16. A process to obtain anionic polyurethanes according to claim 2, comprising the following steps:
   obtaining a prepolymer by reacting the perfluoropolyether diol component a) with component c.0) salified with a tertiary amine and the diisocyanate component b) in excess at a temperature between 20° C. and 40° C. and in a solvent that is partially or totally soluble in water and does not contain reactive hydrogen groups,
   wherein a dry product concentration of the reaction mixture containing the prepolymer is higher than 80% by weight, and
   wherein the end of the reaction is determined by controlling the NCO titre according to ASTM D 2572 and wherein the reaction continues until the disappearance of the NCO group by IR at 2260 $cm^{-1}$; and
   dispersing the reaction mixture containing the prepolymer in water at a temperature from 5° C. to 15° C. and adding a mixture of component d) diamines containing one silicon atom in each of its molecules and optional component e),
   wherein components d) and e) are added in amounts such that the meq. of total aminic groups is lower than 2% with respect to the NCO meq. of the prepolymer.

17. A process for obtaining cationic polyurethanes according to claim 2, comprising the following steps:
   obtaining an NCO ended bifunctional fluorinated prepolymer by reacting the bifunctional perfluoropolyethers component a) with the diisocyanates component b) in molar excess, at a temperature from 50° C. to 70° C. with a dry product content between 50% and 70% by weight by using an organic solvent that is partially or totally soluble with water and does not contain reactive hydrogen groups, wherein the end of the reaction is determined by controlling the NCO titre according to ASTM D 2572;

maintaining the reaction mixture containing the NCO ended bifunctional fluorinated prepolymer at a temperature from 50° C. to 70° C. and adding a mixture of c.1) and/or c.2) group diol, and optionally the aliphatic diol component e) in an amount such that the OH equivalents are less than the NCO eq.;

cooling the reaction mixture to a temperature between 15° C. to 25° C. and adding component d) so that the total equivalents of aminic groups are equal to the NCO titre;

salifying the polymer obtained with organic acids, or by carrying out the quaternization of the tertiary aminic nitrogen atoms in the polyurethane with nitrogen alkylating agents; and adding water to the organic solution of the salified polymer under stirring by distilling the organic solvent under vacuum.

* * * * *